US011777788B2

(12) United States Patent
Mortensen et al.

(10) Patent No.: US 11,777,788 B2
(45) Date of Patent: *Oct. 3, 2023

(54) NETWORK ISSUE TRACKING AND RESOLUTION SYSTEM

(71) Applicant: Cisco Technology, Inc., San Jose, CA (US)

(72) Inventors: Magnus Mortensen, Cary, NC (US); Jay Kemper Johnston, Raleigh, NC (US); David C. White, Jr., St. Petersburg, FL (US)

(73) Assignee: Cisco Technology, Inc., San Jose, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 17/522,534

(22) Filed: Nov. 9, 2021

(65) Prior Publication Data
US 2022/0070051 A1 Mar. 3, 2022

Related U.S. Application Data

(63) Continuation of application No. 16/523,463, filed on Jul. 26, 2019, now Pat. No. 11,196,614.

(51) Int. Cl.
*H04L 41/0631* (2022.01)
*H04L 41/0654* (2022.01)
*G06N 3/08* (2023.01)

(52) U.S. Cl.
CPC ........... *H04L 41/0636* (2013.01); *G06N 3/08* (2013.01); *H04L 41/0654* (2013.01)

(58) Field of Classification Search
CPC ............ H04L 41/0636; H04L 41/0654; H04L 41/064; H04L 41/16; H04L 63/1425;
(Continued)

(56) References Cited

U.S. PATENT DOCUMENTS 7,107,339 B1 9/2006 Wolters
8,813,025 B1 8/2014 Hammet et al.
(Continued)

OTHER PUBLICATIONS

Hsu et al., "Neural Network-Based Clustering Using Pairwise Constraints", Georgia Tech, College of Computing, Workshop track—ICLR 2016, https://www.cc.gatech.edu/~zk15/papers/HsuKiralCLR2016.pdf, 12 pages.

*Primary Examiner* — Hardikkumar D Patel
(74) *Attorney, Agent, or Firm* — BEHMKE INNOVATION GROUP LLC; James M. Behmke; Jonathon P. Western

(57) ABSTRACT

In one embodiment, an issue analysis service obtains telemetry data from a plurality of devices in a network across a plurality of time intervals. The service detects a failure event in which a device in the network is in a failure state. The service clusters the telemetry data obtained prior to the failure event into rounds according to time intervals in which the telemetry data was collected. Each round corresponds to a particular time interval. The service applies a machine learning-based classifier to each one of the rounds of clustered telemetry data to identify one or more common traits appearing in the telemetry data for each round. The service generates a trait change report indicating a change in the one or more common traits appearing in the telemetry data across the rounds leading up to the failure event.

20 Claims, 15 Drawing Sheets

(58) Field of Classification Search
CPC .......... G06N 3/08; G06N 3/042; G06N 3/088; G06N 5/01; G06N 20/00; G06F 21/554; G06F 16/254; G06F 21/552; G06F 2221/034

See application file for complete search history.

(56) References Cited

U.S. PATENT DOCUMENTS

| | | | |
|---|---|---|---|
| 9,813,435 B2 | 11/2017 | Muddu et al. | |
| 10,043,006 B2 | 8/2018 | Puri et al. | |
| 2015/0135012 A1* | 5/2015 | Bhalla | H04L 41/0631 |
| | | | 714/26 |
| 2016/0359695 A1 | 12/2016 | Yadav et al. | |
| 2016/0371489 A1* | 12/2016 | Puri | G06F 16/254 |
| 2019/0163546 A1* | 5/2019 | Ungar | G06F 11/34 |
| 2020/0005093 A1* | 1/2020 | Vichare | G06F 18/22 |
| 2020/0180148 A1* | 6/2020 | S Nanal | G05B 19/0423 |
| 2020/0213203 A1 | 7/2020 | Mortensen et al. | |

\* cited by examiner

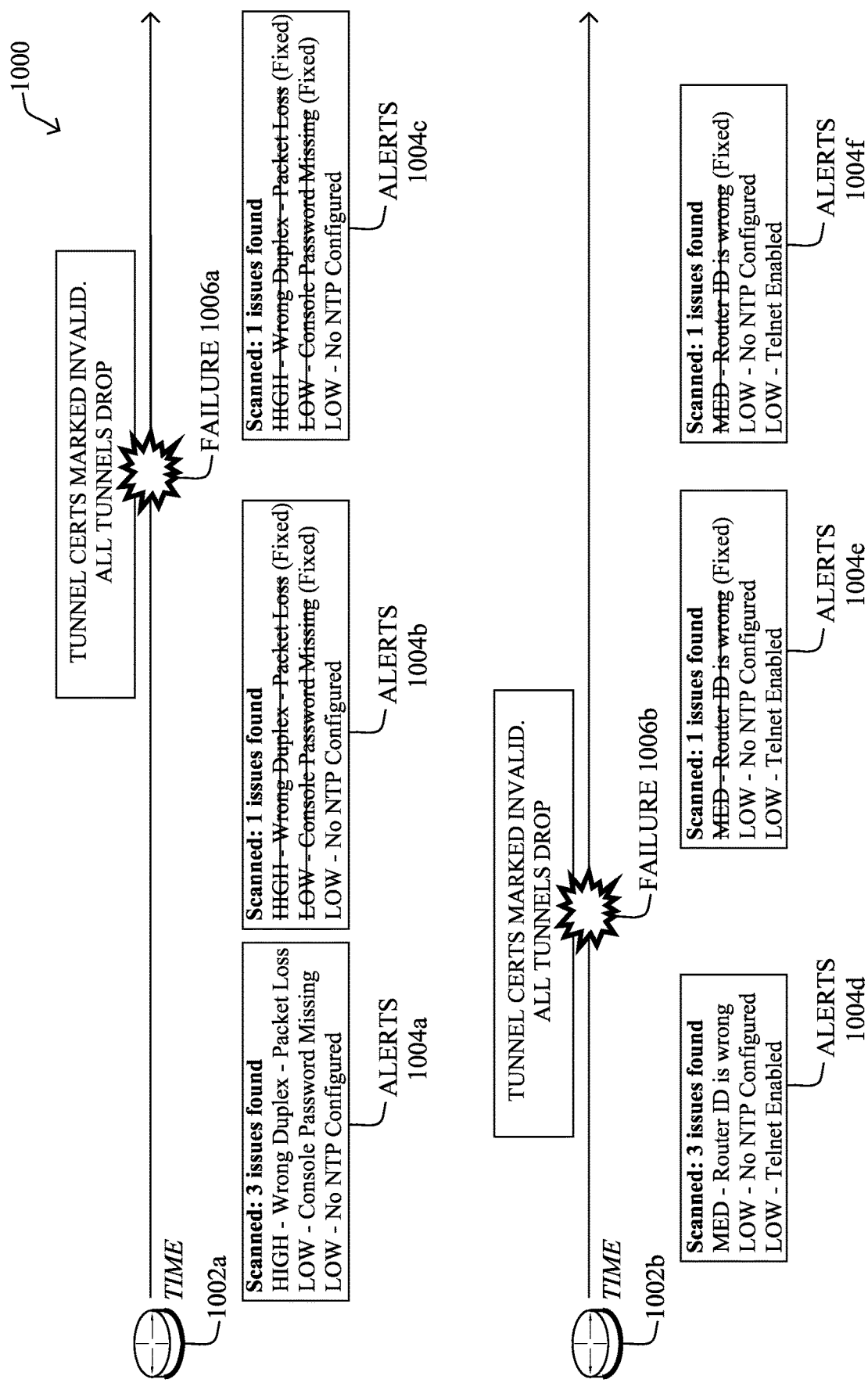

NETWORK ISSUE TRACKING AND RESOLUTION SYSTEM

RELATED APPLICATION

This application is a continuation of U.S. patent application Ser. No. 16/523,463, filed on Jul. 26, 2019, entitled NETWORK ISSUE TRACKING AND RESOLUTION SYSTEM, by Magnus Mortensen et al., the entire contents of which are incorporated by reference herein.

TECHNICAL FIELD

The present disclosure relates generally to computer networks, and, more particularly, to a network issue tracking and resolution system.

BACKGROUND

Many organizations now include a network operations center (NOC) that is responsible for managing the daily operations of the organization's devices and communication networks. Typically, a technology assistance center (TAC) also works closely with the NOC and provides support to users, to resolve technical issues that may arise. For example, a user may open a TAC support ticket and a support specialist may help to diagnose and resolve the technical issue experienced by the user.

In general, intellectual capital (IC) encompasses a variety of information from multiple data sources, including, for example, online resources, human experts, etc. For example, in the contexts of network operations and/or user support, information regarding how to resolve a technical issue or evaluate the performance of the network may come from a manufacturer's website, from a seasoned network expert in the organization, from a message board, etc. Such IC may also be captured within a management/support system, thereby allowing the users of the system to share and leverage the collective information. For example, a network expert may create an entry in the management system that lists the steps to resolve a particular networking issue. In turn, whenever this issue appears, the guidance from the network expert can be accessed and leveraged, to resolve the issue. However, issue tracking and resolution is still primarily a manual task, leading to the potential for new problems going unidentified, the root causes of problems not being addressed, and low-priority problems leading to higher-impact problems over time.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 10A-10B illustrate examples of the operation of the impact analysis module of FIG. 9.

DESCRIPTION OF EXAMPLE EMBODIMENTS

Overview

Figure 1A:
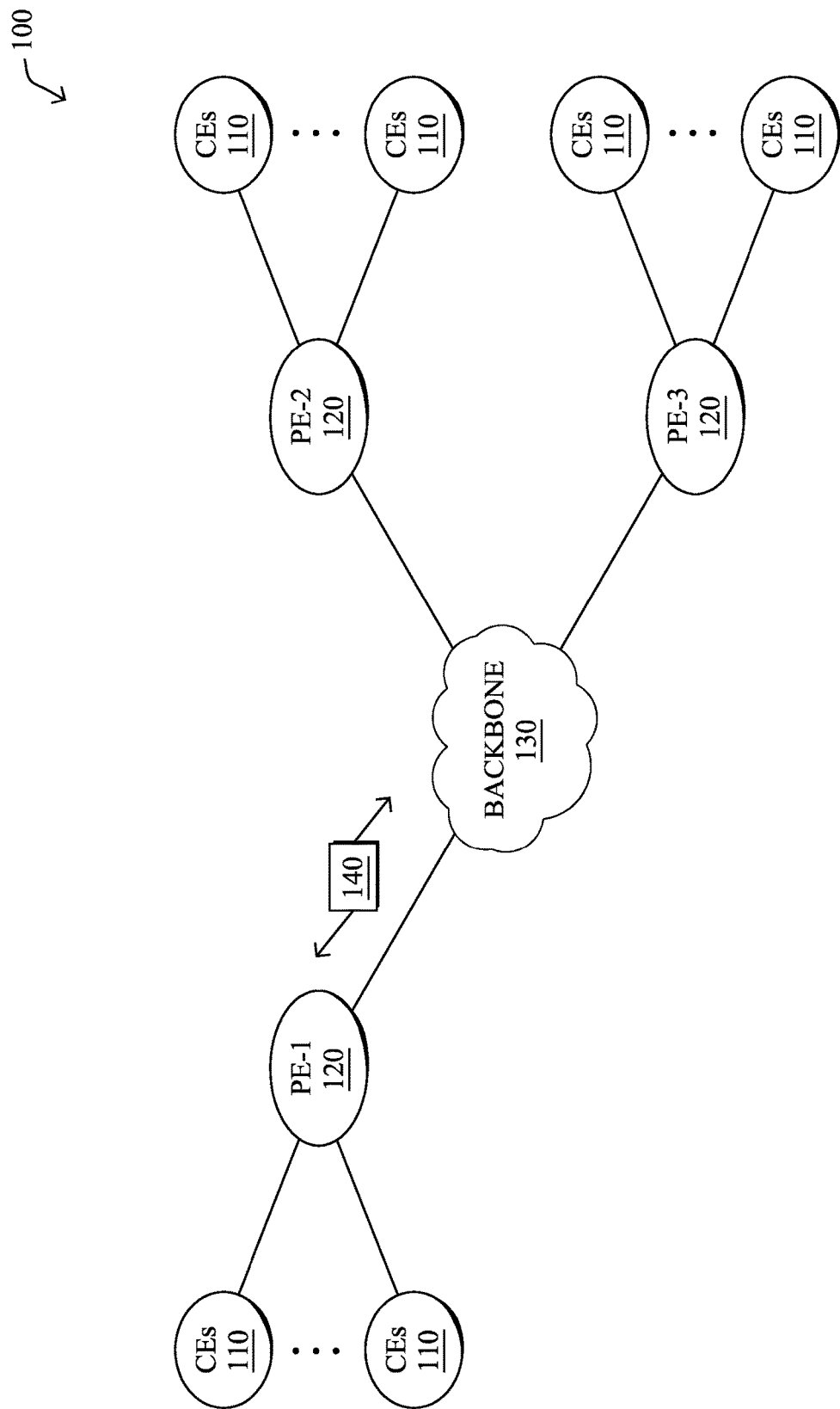
FIGS. 1A-1B illustrate an example communication network.

According to one or more embodiments of the disclosure, an issue analysis service obtains telemetry data from a plurality of devices in a network across a plurality of time intervals. The service detects a failure event in which a device in the network is in a failure state. The service clusters the telemetry data obtained prior to the failure event into rounds according to time intervals in which the telemetry data was collected. Each round corresponds to a particular time interval. The service applies a machine learning-based classifier to each one of the rounds of clustered telemetry data to identify one or more common traits appearing in the telemetry data for each round. The service generates a trait change report indicating a change in the one or more common traits appearing in the telemetry data across the rounds leading up to the failure event.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers) via a single CE router, with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
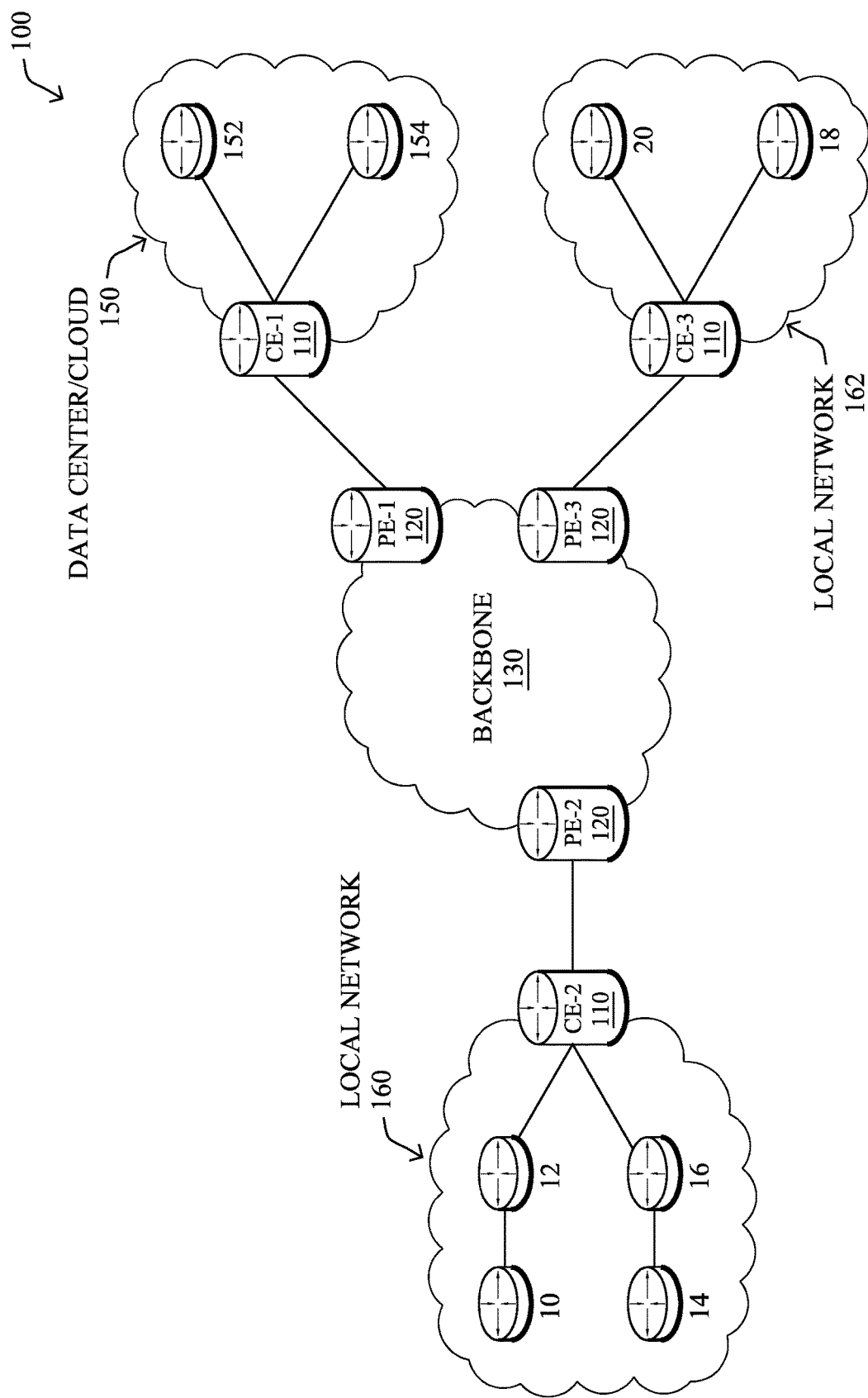

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such as the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
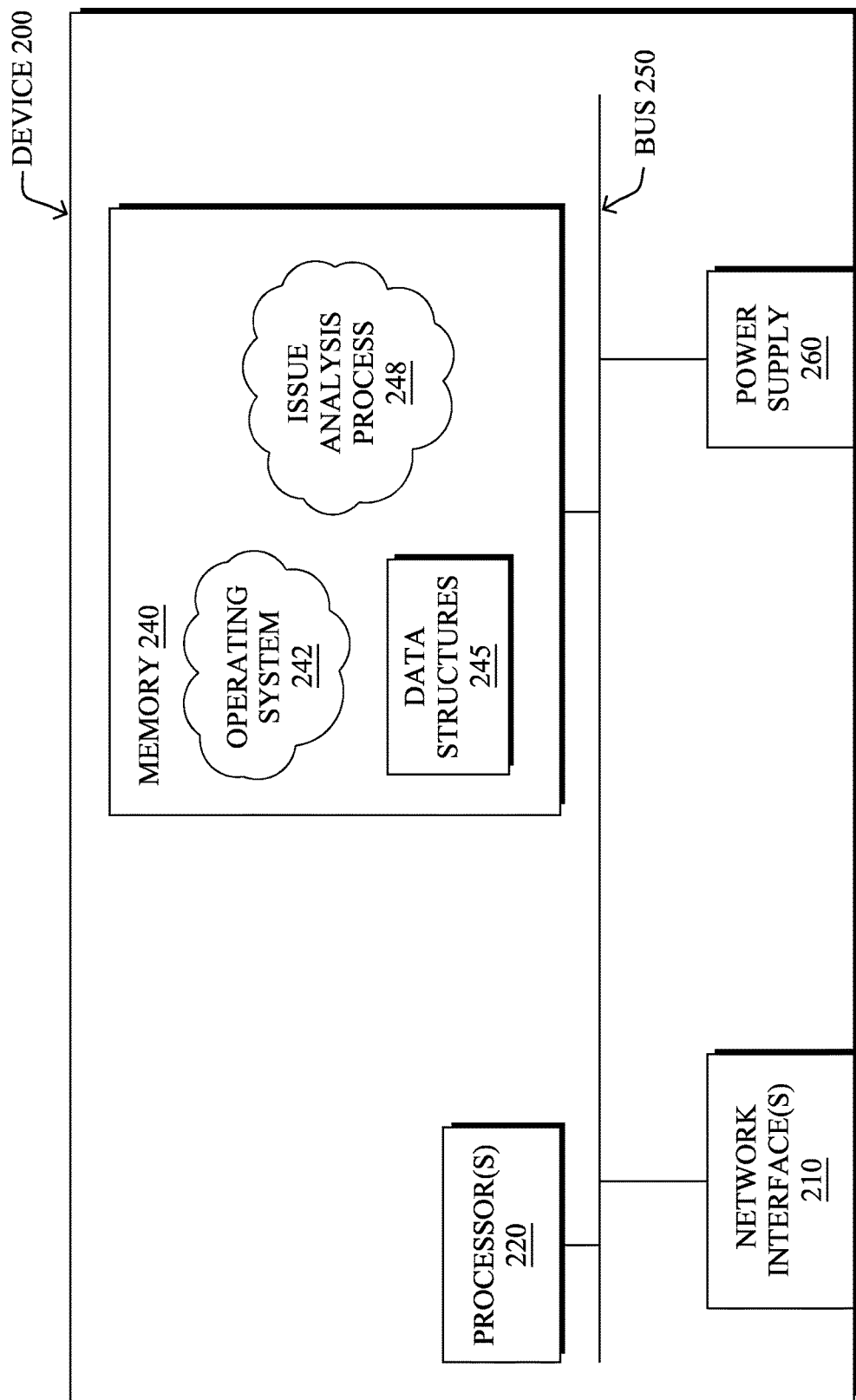
FIG. 2 illustrates an example network device/node.

FIG. 2 is a schematic block diagram of an example node/device 200 (i.e., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may an issue analysis process 248, as described herein, any of which may alternatively be located within individual network interfaces, to provide an issue analysis service to one or more networks.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, and as described in greater detail below, the issue analysis service provided by issue analysis process 248 may identify and assess issues in a network, such as device failures, device or network health status conditions, events in the network, and the like. To do so, in various embodiments, issue analysis process 248 may use machine learning techniques. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Example machine learning techniques that issue analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

One class of machine learning techniques that is of particular use in the context of analyzing issues in a network is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of issue analysis. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

As noted above, issue tracking and resolution today is still primarily a manual process. This leads to a number of challenges in many modern issue tracking services:
- Non-bug issues have been found to make up approximately 95% of all support cases, but are not currently tracked uniquely, as in the case of true bugs. Thus, even if intellectual capital (IC) is captured by the system regarding a solution, the IC remains localized to the specific issue being reported. By way of example, a misconfiguration of a device may lead to the experienced issue.
- Failure events are often assessed in a bubble and with little regard to the sequence of events leading up to a failure. Indeed, many failures in a network are actually the result of a series of otherwise benign events. Typical issue analysis services, however, typically only consider errors and alerts that were raised, leading up to the failure.
- Alerts are often prioritized for the convenience of the network operator, but assessing the impact of not addressing a low-severity alert is left solely to the experience of the operator. Indeed, seemingly low-severity alerts can sometimes result in higher severity issues, if they are ignored.

Network Issue Tracking and Resolution System

The techniques herein introduce a network issue tracking and resolution system that addresses the limitations of current issue tracking systems through the use of machine learning. In some aspects, the techniques herein are able to identify new issues in the network and automatically learn solutions to the issues. In further aspects, the techniques herein are able to identify the set of events leading up to a failure in the network, allowing a network operator to quickly determine the root cause of the failure. In additional aspects, the techniques herein can automatically identify the impact of low-severity alerts that could otherwise lead to higher severity situations.

Specifically, according to one or more embodiments of the disclosure as described in detail below, an issue analysis service determines that an issue exists with a device in a network. The service searches a decision tree for a solution to the issue, wherein branch nodes of the decision tree comprise diagnostic checks. The service clusters, based on a determination that a solution to the issue does not exist in the decision tree, telemetry for the device with telemetry for one or more other devices that also experienced the issue. The service uses a neural network to identify a difference between the clustered telemetry and telemetry from one or more devices for which the issue was resolved. The service adds a leaf node to the decision tree with the identified difference as a solution to the issue.

Illustratively, the techniques described herein may be performed by hardware, software, and/or firmware, such as in accordance with the issue analyzer 248, which may include computer executable instructions executed by the processor 220 (or independent processor of interfaces 210) to perform functions relating to the techniques described herein.

Figure 3:
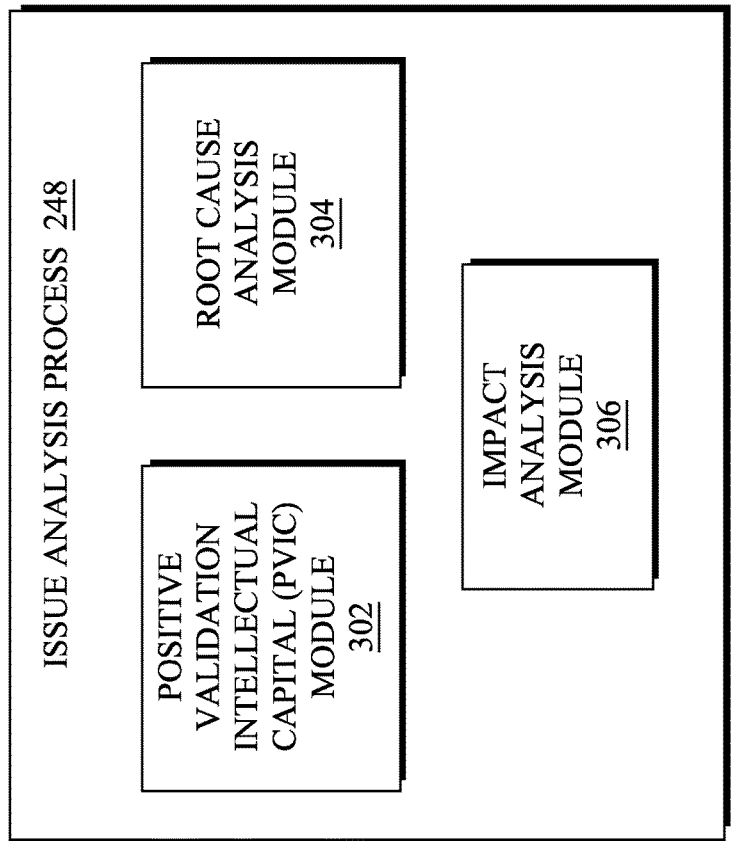
FIG. 3 illustrates an example architecture for analyzing issues in a network.

Operationally, FIG. 3 illustrates an example architecture 300 for analyzing issues in a network. At the core of architecture 300 is issue analysis process 248 which may comprise any or all of the following sub-components: a positive validation intellectual capital (PVIC) module 302, a root cause analysis module 304, and/or an impact analysis module 306. In various embodiments, these components may be executed directly on the networking device under scrutiny or, alternatively, by another device in communication therewith. In further cases, these components may be implemented in a distributed manner across any number of devices. In such cases, these devices may be viewed as a singular device/system, for purposes of executing interface analysis process 248. Moreover, while components 302-306 are shown, their functionalities can be combined or omitted, as desired.

Figure 4:
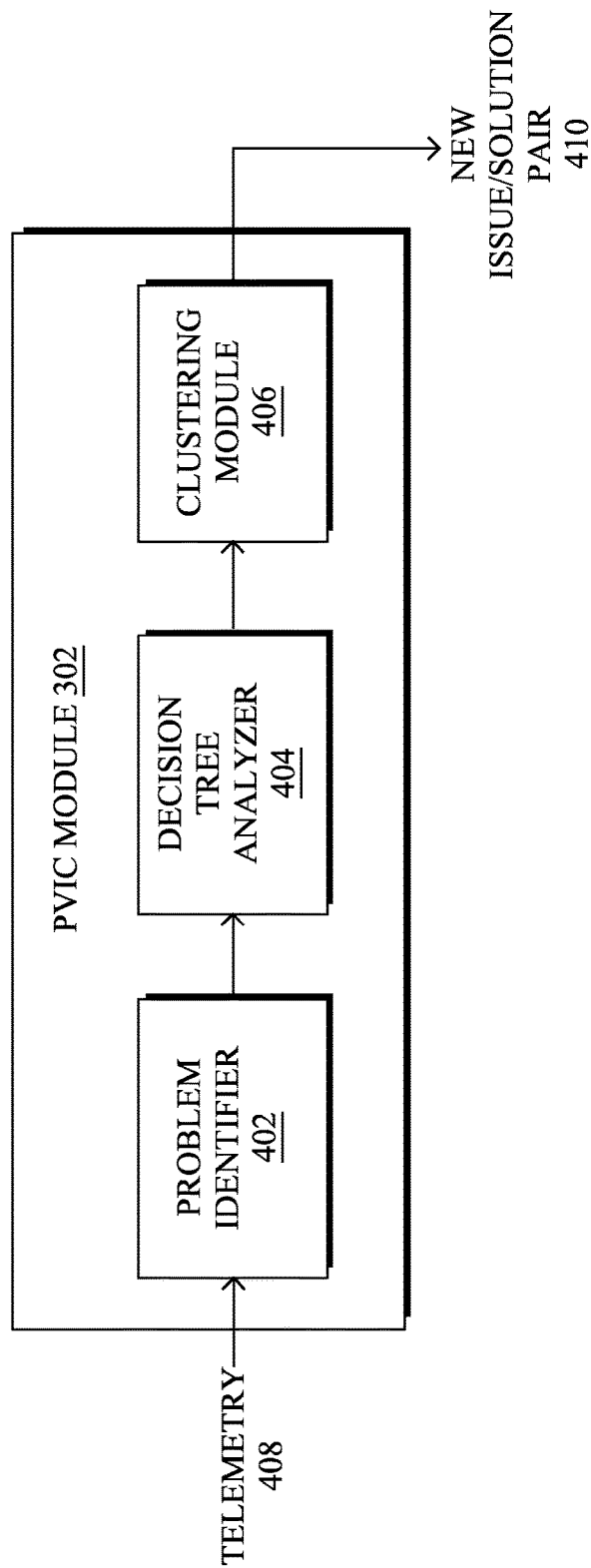
FIG. 4 illustrates an example architecture for a Positive Validation Intellectual Capital (PVIC) module.

FIG. 4 illustrates an example architecture 400 for PVIC module 302, according to various embodiments. As shown in architecture 400, PVIC module 302 may comprise any or all of the following sub-components: a problem identifier 402, a decision tree analyzer 404, and/or a clustering module 406. When executed, these components 402-406 may operate in conjunction with one another to assess telemetry 408 from one or more monitored network and identify a new issue (problem)/solution pair 410.

In general, the objective of PVIC module 302 is to automatically identify all issues experienced in a monitored network. To achieve this, PVIC module 302 must first detect when devices in the network(s) are actually exhibiting symptoms of a problem. This is done, in various embodiments, by PVIC module 302 taking advantage of what is referred to herein as "Positive Validation intellectual Capital (PVIC)." In other words, PVIC module 302 may operate to positively determine that a given feature of a device or node is operating as expected/configured, instead of attempting to catalog all possible failure conditions of that given feature. Indeed, one does not need to be aware of all possible issues, both known and unknown, in order to determine that something is working. In other words, PVIC module 302 may leverage the fact that it is typically much easier to verify that something is working, than to know why something is not (one is a bounded problem, and the other is unbounded).

To this end, PVIC module 302 may include a problem identifier 402 that obtains telemetry 408 from any number of devices in the monitored network(s). Such telemetry 408 may include, but is not limited to, any or all of the following:
- Log data from the device under scrutiny
- Configuration information for the device under scrutiny
- Command line interface data from the device under scrutiny
- Traffic telemetry for traffic associated with the device under scrutiny
- Metadata associated with any of the above data that helps provide additional context During execution, problem identifier 402 may assess the telemetry 408, which may be provided on a push or pull basis to problem identifier 402, in an attempt to positively identify whether the device or a feature of the device (e.g., a software module, etc.) is operating as expected. For example, consider the case of the device under scrutiny supporting the Enhanced Interior Gateway Routing Protocol (EIGRP). In such a case, problem identifier 402 may assess telemetry 408, to perform the following:
1. Detect whether the EIGRP feature is enabled on the device
2. Check whether the EIGRP feature is properly configured on the device (e.g., not have an incomplete or incorrect configuration)
3. Verify that the EIGRP feature of the device is operating as expected (e.g., its neighbors are in an established state, routes are exchanged, etc.).

The above steps can be generalized by problem identifier 402 to assess any number of different features supported by the devices in the network, such as switches, routers, etc.

If problem identifier 402 cannot positively identify that the feature is operating as expected, then problem identifier 402 may determine that a problem exists. For instance, in the above example, problem identifier 402 may determine that a problem exists with the EIGRP feature of a particular router, if the router is not exchanging routes with its EIGRP neighbor(s).

When problem identifier 402 identifies a problem with a feature of a device in the network, PVIC module 302 may use decision tree analyzer 404 to systematically search a hierarchical decision tree for the feature. In various embodiments, such a decision tree may include branch nodes that comprise diagnostic checks and at least some leaf nodes that represent solutions to the issue/problem. At each stage of its analysis, decision tree analyzer 404 may further refine the issue and check for various conditions. Eventually, decision tree analyzer 404 will either reach a leaf node that has an associated solution to the issue, indicating that there is existing intellectual capital for the specific problem, or reach a 'dead end,' meaning that no solution is currently known.

While it is quite powerful to use a decision tree to solve identified problems in a network, a key function of PVIC module 302 is to identify new problems/issues, determine their solutions, automatically, and update the decision tree, so that future instances of the problem can be solved. To do so, when decision tree analyzer 404 determines that a solution leaf node does not exist in the tree for the specific issue/problem, decision tree analyzer 404 may assign an issue ID to the unknown problem and all of its associated telemetry 408.

In various embodiments, PVIC module 302 may also include a clustering module 406 configured to use machine learning on the identified problems that do not have a known solution, to learn a new issue solution pair 410. In some embodiments, clustering module 406 may do so by using the new issue IDs issued by decision tree analyzer 404 and their associated telemetry 408 as input to an unsupervised neural network. For example, such a model may use pairwise Kullback-Leibler (KL) divergence, or the like, to tune the cost function and determine the features in the dataset. In turn, clustering module 406 may apply clustering to the output, to learn solutions to the newly identified problems.

More specifically, as more and more telemetry 408 is fed through PVIC module 402, more and more issue IDs will be created with 'unknown' solutions. These can be represented, for example, in the decision tree as a single leaf that acts as a 'bucket' of instances of issues/problems that exhibit the same symptoms. Over time, clusters will emerge meaning that each issue within that cluster will have the same solution.

In various embodiments, PVIC module 302 may track when issues become resolved, to learn a solution for a particular issue (e.g., through the collection of additional telemetry 408). This allows clustering module 406 to determine what has changed and resulting in the issue being resolved. For example, assume that a network administrator changes the EIGRP settings of a particular router, resulting in the router now being able to exchange EIGRP routes with its neighbors. Through the collection of telemetry 408 over time, the changed setting can be captured by PVIC module 302 and learned over time as the solution to the issue.

Figure 5:
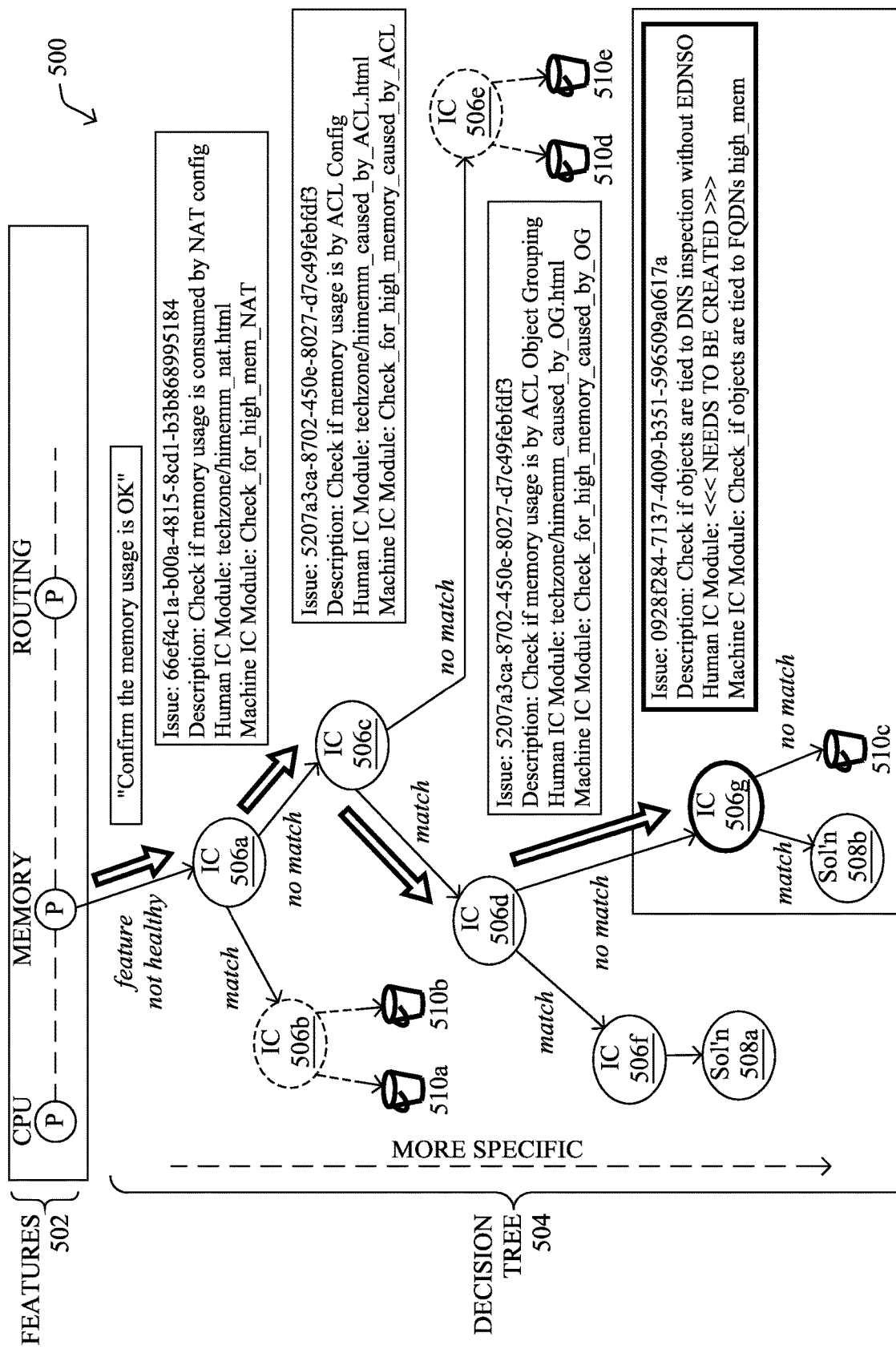
FIG. 5 illustrates an example of the operation of the PVIC module of FIG. 4.

FIG. 5 illustrates an example 500 of the operation of PVIC module 302. As shown, PVIC module 302 may assess the various features 502 of a device under scrutiny such as its CPU usage, memory usage, routing functions, etc. If any of these features are deemed problematic, PVIC module 302 may begin searching a corresponding decision tree 504 for a solution to the issue. As shown, decision tree 504 may generally comprise three different types of nodes: 1.) branch nodes 506 that represent various diagnostic checks, 2.) solution nodes 508 that are leaf nodes and represent a solution to the encountered issue/problem, and 3.) bucket nodes 510 that represent 'buckets' of detected issues for which no solution is known.

For example, as shown, assume that problem identifier 402 of PVIC module 302 determines that memory consumption of a device is abnormally high. This can be achieved either through thresholding or via machine learning-based anomaly detection mechanisms. To diagnose the excessive memory consumption, decision tree analyzer 404 of PVIC module 302 may traverse decision tree 504, performing various diagnostic tests at each branch node 506 of decision tree 504. Each of these diagnostic tests represents its own intellectual capital (IC) that can be learned over time by PVIC module 302. In addition, the deeper into decision tree 504, the more specific the issues and solutions may become. For example, a first node 506a may represent a first diagnostic check to ensure that the high memory usage of the device is not due to Network Address Translation (NAT) operations of the device. If not, decision tree analyzer 404 may move on to node 506c that then checks whether the high memory usage is attributable to an access control list (ACL) configuration of the device. If so, decision tree analyzer 404 may then move on to node 506d that assess a more specific ACL configuration of the device, such as whether the high memory usage is attributable to ACL object G grouping. Finally, decision tree analyzer 404 may move on to node 506g which assesses whether the high memory usage is associated with objects being tied to DNS inspection without EDNS0. If so, decision tree analyzer 404 may arrive at solution leaf node 508b and provide the solution to a user interface and/or initiate a corrective measure, automatically (e.g., by reconfiguring the device, etc.).

For purposes of illustration, assume that decision tree analyzer 404 determines that the symptoms of the device do not match those of node 506g of decision tree 504 and that no further branch nodes 506 or solution nodes 508 are available in decision tree 504. Thus, no solution currently exists for the issue exhibited by the device under scrutiny. In such a case, decision tree analyzer 404 may assign a new issue ID to the issue and place it in bucket node 510c with its associated telemetry 408.

Figure 6A:
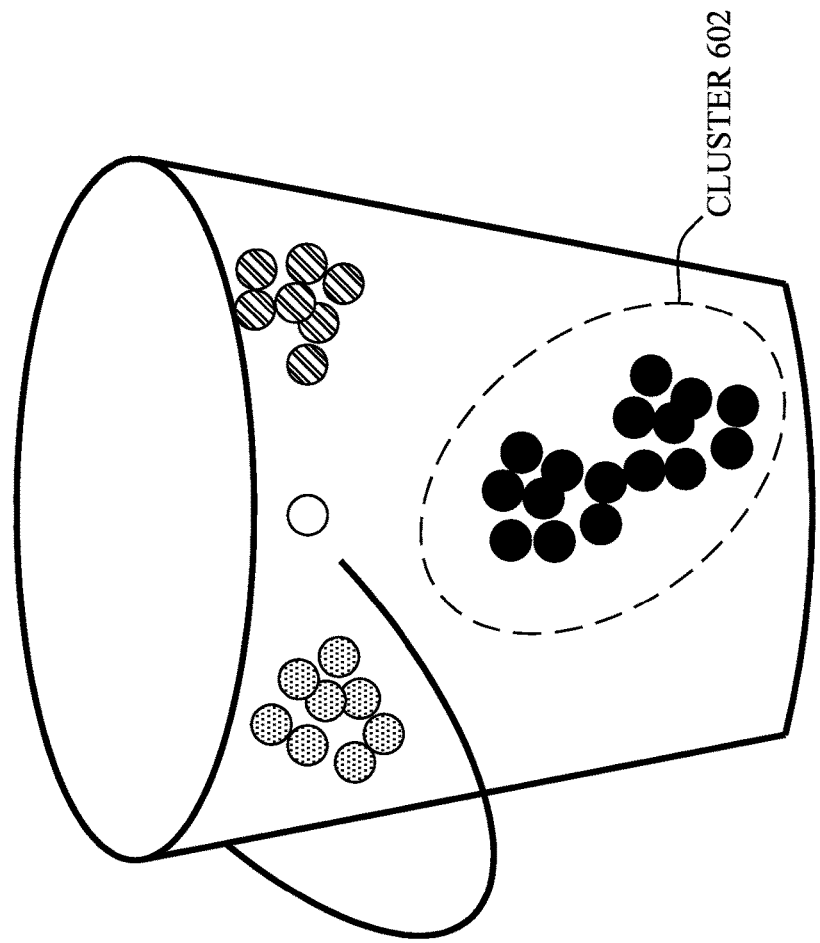
FIGS. 6A-6B illustrate examples of the learning of new issues/problems and solutions over time.

FIG. 6A illustrates an example of bucket node 510c, according to various embodiments. Over time, more and more instances of issues may accumulate in bucket node 510c and clusters of different issue instances will appear. For example, as shown cluster 602 may include any number of instances of issues that exhibit very similar characteristics (e.g., the types of devices experiencing the issues, the locations of the devices in the network, etc.). For example, the instances in cluster 602 may all involve devices that are running a particular version of code and using DNS based access control list (ACL) objects.

Figure 6B:
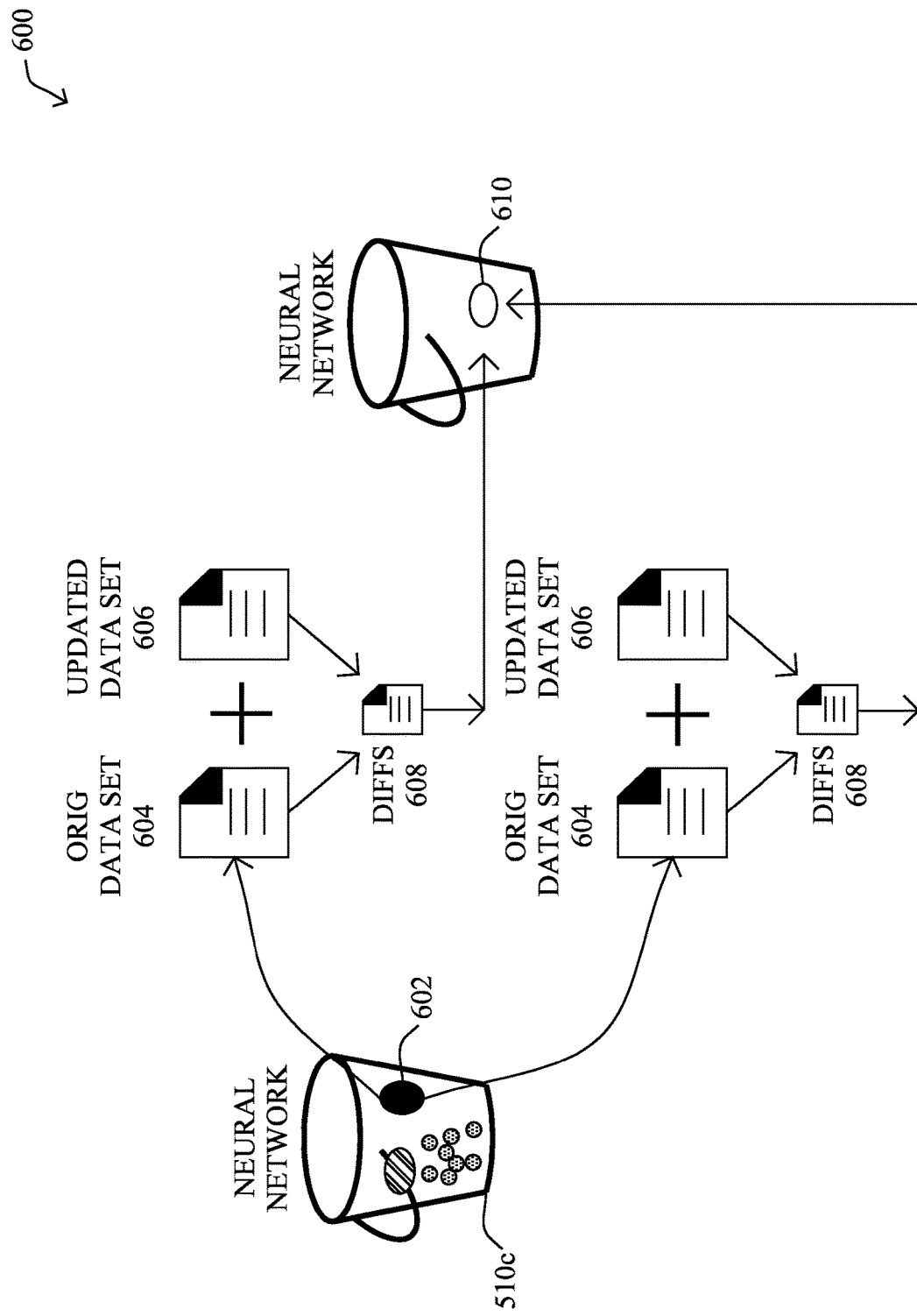

FIG. 6B illustrates an example 600 of the use of a neural network, to learn a solution to an issue over time. As shown, assume that clustering module 406 applies clustering to the telemetry 408 associated with the various issue IDs in bucket node 510c, thereby forming cluster 602. This telemetry 408 for the resulting cluster 602 thus forms an original data set 604 across any number of different characteristics (e.g., settings, parameters, versions, etc.).

To identify a potential solution for the issue, clustering module 406 of PVIC module 302 may continue to track the telemetry 408 for the affected devices, thereby forming a second, updated data set 606. By using these two data sets 604-606 as input to a neural network, the network can identify any differences 608 from when the issue/problem was resolved, as determined by problem identifier 402. In turn, PVIC module 302 may flag the resulting one or more difference(s) 610 as a solution for the issue underlying those in cluster 602. PVIC module 302 may then add a new leaf node to its decision tree with the identified solution. For example, assume that a particular DNS setting on the device(s) is causing them to exhibit high memory consumption and that changes to this setting results in the devices reverting back to normal memory consumption. By leveraging a neural network and tracking the device configurations, PVIC module 302 can not only identify new issues, but also learn their solutions over time. Thus, once a new solution node is added to its decision tree, PVIC module 302 can quickly initiate corrective measures for the issue.

In summary, in various embodiments. PVIC module 302 may operate by:

1. Identifying when a particular device feature is not operating as expected, thereby indicating that an issue/problem exists
2. Evaluating telemetry for the device against a decision tree, to diagnose and solve the identified problem
3. As PVIC module 302 gets deeper into the decision tree, it gets closer to a root cause (e.g., a particular leaf)
4. If PVIC module 302 reaches a leaf node that does not have an associated solution, it may create a new issue identifier and associate the telemetry for the issue into a 'bucket' of unknown issues. This bucket may take the form of an unsupervised neural network that has been tailored to both extract the features of the data set and output the results in clusters.
5. Once a significant number of data sets are present in the bucket, a clear cluster emerges, indicating devices with similar characteristics are experiencing the same underlying issue.
6. PVIC module 302 tracks the telemetry of the devices in the cluster over time, to identify when the issue/problem stops presenting.
7. PVIC module 302 may send the identified differences to another bucket (e.g., a similar unsupervised neural network designed to output clustered results).
8. When a threshold number devices in the original cluster stop exhibiting the issue, a new cluster will emerge from the second neural network, indicating the exact change(s) needed to resolve the issue. PVIC module 302 can then store this information as a new issue/solution pair within its decision tree.
9. Further data sets can then be evaluated against the new decision tree node and matched automatically, if their data satisfies the corresponding diagnostic checks in the tree.

Referring again to FIG. 3, another potential component of issue analysis process 248 is root cause analysis module 304, in various embodiments. Whereas PVIC module 302 may identify new issues and their solutions, root cause analysis module 304 may be responsible for identifying the specific changes on the device that led to a particular issue/problem manifesting. For example, it has been shown that approximately 28% of all software bugs that result in a device "crashing" and reloading go unfixed because it is very difficult to pinpoint the specific set of software states that led up to the crash event. Indeed, there can be thousands or even millions of variables that could change over time, leadup up to the problem.

Figure 7:
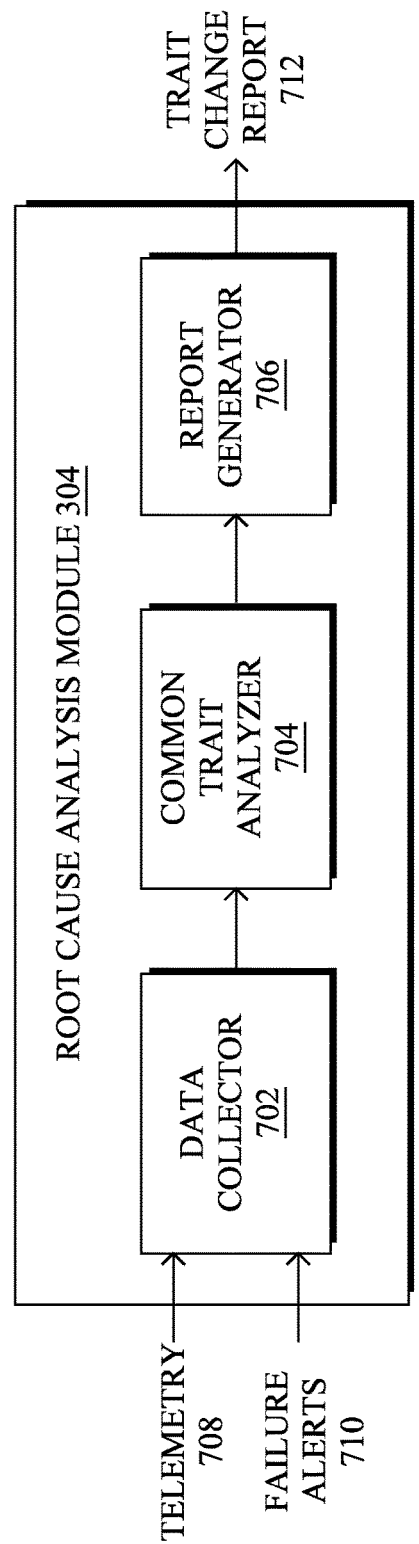
FIG. 7 illustrates an example architecture for a root cause analysis module.

FIG. 7 illustrates an example architecture 700 for root cause analysis module 304, according to various embodiments. As shown, root cause analysis module 304 may include any or all of the following sub-components: a data collector 702, a common trait analyzer 704, and/or a report generator 706. In various implementations, the functionalities of these sub-components can be omitted, combined, or implemented in a distributed manner, as desired.

In general, root cause analysis module 304 leverages telemetry 708 collected regarding a device in a network from times leading up to a failure event, to help determine the specific conditions that led to the failure. In various embodiments, root cause analysis module 304 uses machine learning to calculate which correlated traits are present and how they change over time across multiple devices that experienced the same problem/issue. This is useful to help determine both how to fix the problem and how to predict when that same problem will manifest itself again in the future. Thus, root cause analysis module 304 can also be used predictively to help reduce downtime by avoiding problems before they occur.

In general, data collector 702 is responsible for obtaining telemetry 708 regarding devices under scrutiny in a monitored network. Generally, telemetry 708 may include any or all of the types of data described previously with respect to telemetry 408 assessed by PVIC module 302 such as device logs, CLI outputs, traffic records, metadata, or the like.

Derived metadata that may be included in telemetry 408 can be generated on the fly through the application of code to the diagnostic telemetry for the device. This can easily be complemented by using neural networks to tease out the specific traits for the data set that are common across all of them. For example, the derived metadata in telemetry 408 could include any or all of the following:

The calculated average access-list recursion depth
The calculated free memory available for a specific subsystem on the device
The average determined route prefix-length in the device's routing table For example, the following illustrates an example of derived metadata in a network telemetry reporting system:

{
   'platform' : 'ASA5525',
   'acl_tree_depth' : '23'
   'ospf_free_memory' : '29%'
   ...
}

Likewise, telemetry 408 may also include system state and event information such as the following:

{
   'events' : [
     'Oct 21 14:53:02 CDT: %ASA-session-6-302014:
      Teardown TCP connection', 'Oct 21 14:53:03 CDT: %ASA-session-4-212322: User 'admin' logged in
]
}

Data collector 702 may use the telemetry data 708 that it collects either on a push or pull basis to populate a data lake organized by timestamp. In addition, data collector 702 may obtain failure alerts 710 that are indicative of failures. As a result, data collector 702 now has all of the telemetry 708, including any derived metadata, leading up to a failure event signaled by a failure alert 710.

When a device fails, data collector 702 may match the failure data for the device (e.g., its crash trace in telemetry 708) to a specific problem identifier, such as a bug ID. This is trivial, in most cases, since most software failure states include a backtrace showing the call stack for the issue, which is usually very unique to each problem identifier. Upon matching the failed state to the specific known bug ID, data collector 702 may save all of the telemetry 708, including any derived metadata, leading up to the failure event.

Using the above approach, root cause analysis module 304 now has many different sets of data from any number of devices that all reached the same failure state. In turn, common trait analyzer 704 may organize the collected data into 'rounds' and identify common traits across the different rounds. This is illustrated in example 800 in FIG. 8A. As shown, common trait analyzer 704 may assess the telemetry and metadata 802 collected from devices 806a-806c during the times leading up to crash events 804 for these devices 806. In turn, common trait analyzer 704 may group this data 802 into rounds. For example. Round 1 may include the data 802 captured just before the failure/crash events 804. Round 2 may include the data 802 captured before Round 1, etc. The time interval length used between rounds may be variable and can be automatically adjusted by common trait analyzer 704 to experimentally determine which time values produce the best trait report, as detailed below. Selecting the data 802 associated with each device 806 that correlates by time helps to 'line up' the data sets and make them more meaningful.

As would be appreciated, some samples of data 802 may not align with any of the various rounds. In such cases, the data 802 not falling within a round may be omitted from further consideration. In a further embodiment, the data 802 not falling within a defined round may be swapped into a round, as needed, to further refine the common trait analysis.

Figure 8A:
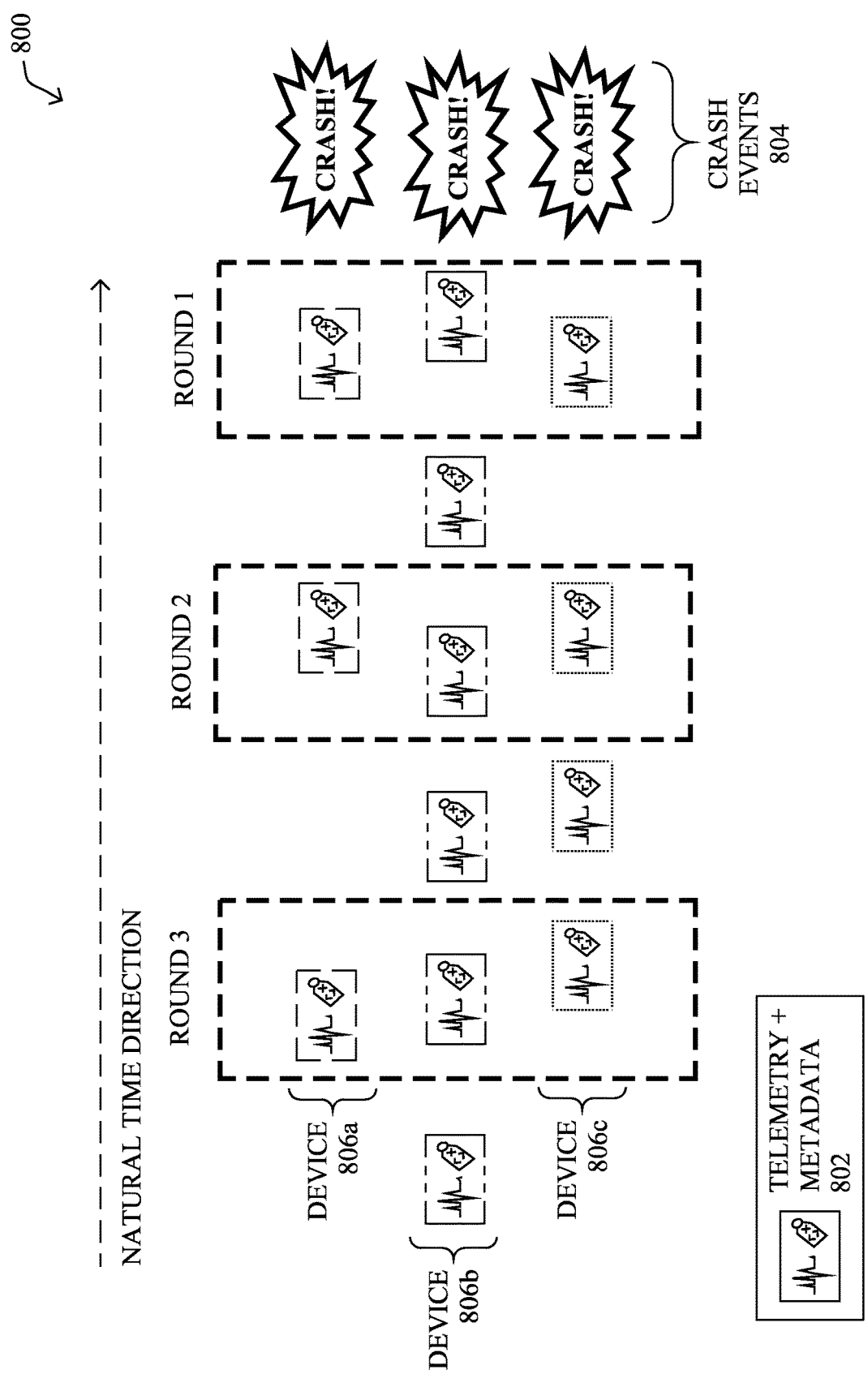
FIGS. 8A-8B illustrate examples of the operation of the root cause analysis module of FIG. 7.
Figure 8B:
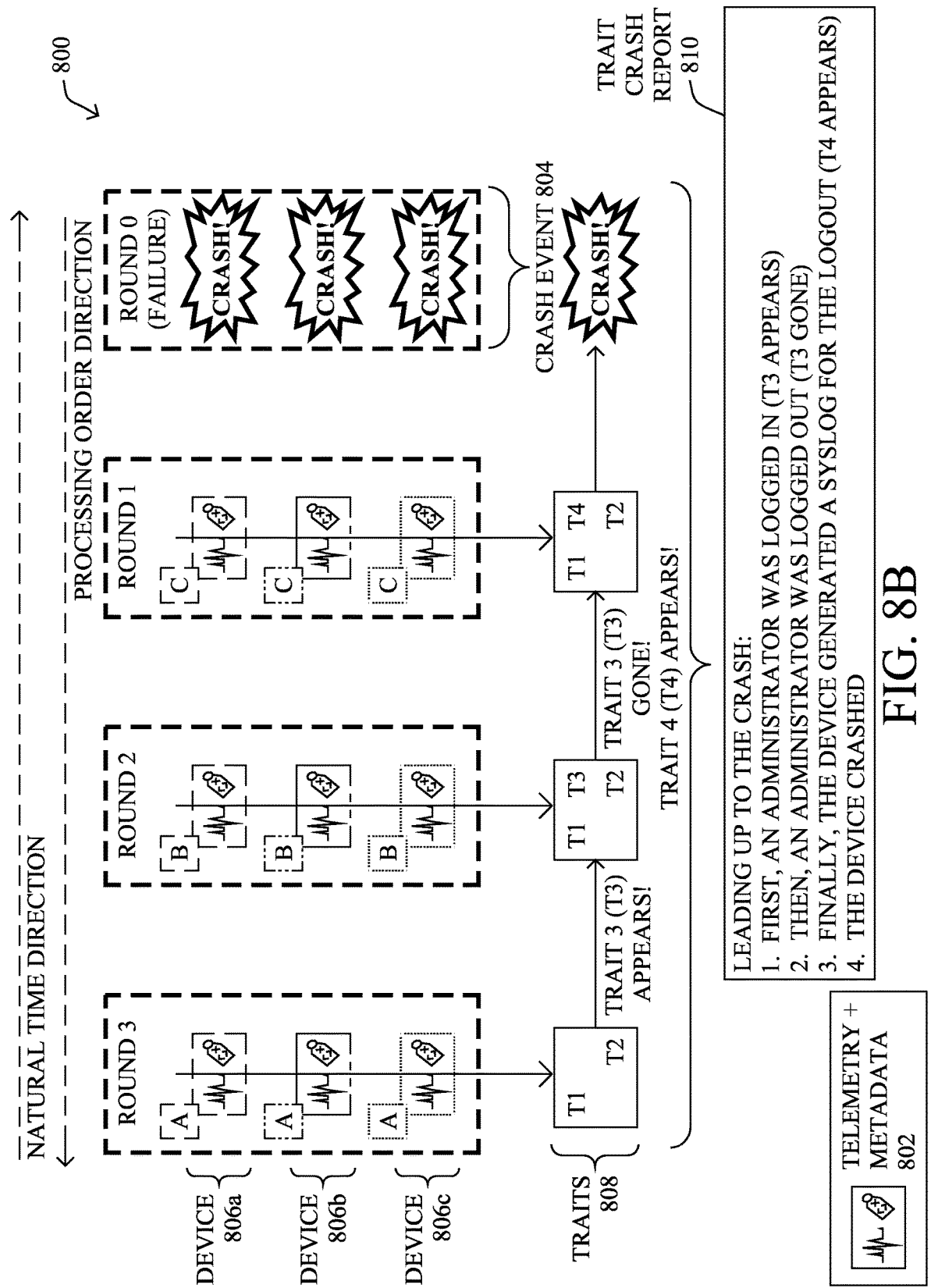

Once common trait analyzer 704 has organized the telemetry and metadata 802 into rounds, it may apply an unsupervised machine learning classifier to the different data sets in the rounds, to find common traits for a given round. Continuing the example 800 of FIG. 8A, FIG. 8B illustrates such an analysis. As shown, each round prior to a the failure/crash event 804 may comprise any number of samples of telemetry and metadata 802 captured during its corresponding time window. In turn, common trait analyzer 704 may apply a classifier to the dataset, to extract out the common traits 808 appearing in the data for that round.

Referring again to FIG. 7, report generator 706 may assess the common traits identified by common trait analyzer 704, to generate a trait change report 712. As would be appreciated, the changes in the common traits leading up to a failure/crash event helps to 'tell the story' to a network administrator. Thus, by providing report 712 to a user interface, the reviewing administrator can take preventative measures in the future to avoid a similar failure/crash from occurring in the network.

FIG. 8B illustrates the analysis of the progression of common traits 808 by report generator 706 to generate a trait crash report 710. For example, between Round 3 and Round 2, a new trait, T3, may appear. Then, T3 may disappear from Round 2 to Round 3, but another new trait, T4, may appear. This allows report generator 706 to lay out the series of changes in report 810. For example, say that trait T3 corresponds to an administrator being logged into the device and that trait T4 corresponds to the device generating a syslog for the administrator logging out of the device. This allows a user reviewing report 810 to reconstruct the circumstances leading up to the type of crash/failure on the various devices 806: the administrator was logged in, then the administrator was logged out, then the syslog for the logout was generated and, finally, the device 806 crashed. Review of this report 810 can then help the administrator deduce that the cause of the crash was related to the syslog generation.

Referring yet again to FIG. 3, another component of issue analysis process 248 is impact analysis module 306, according to various embodiments. Another failure of current diagnostic systems is that they tend to only focus on the current or observable impact of a detected issue, rather than its potential impact. For example, one alert may read "NTP is not configured and, as a result, the system clock may not be correct." In this case, the lack of NTP configuration is the issue and the system clock not being correct is the observable symptom. However, focusing on only the immediate impact/symptom is nearsighted and does not allow the system to understand the actual downstream or potential future impact of issues. Moreover, it has been shown that seemingly insignificant, low severity issues are often ignored until they suddenly evolve into much more significant problems in the future.

Figure 9:
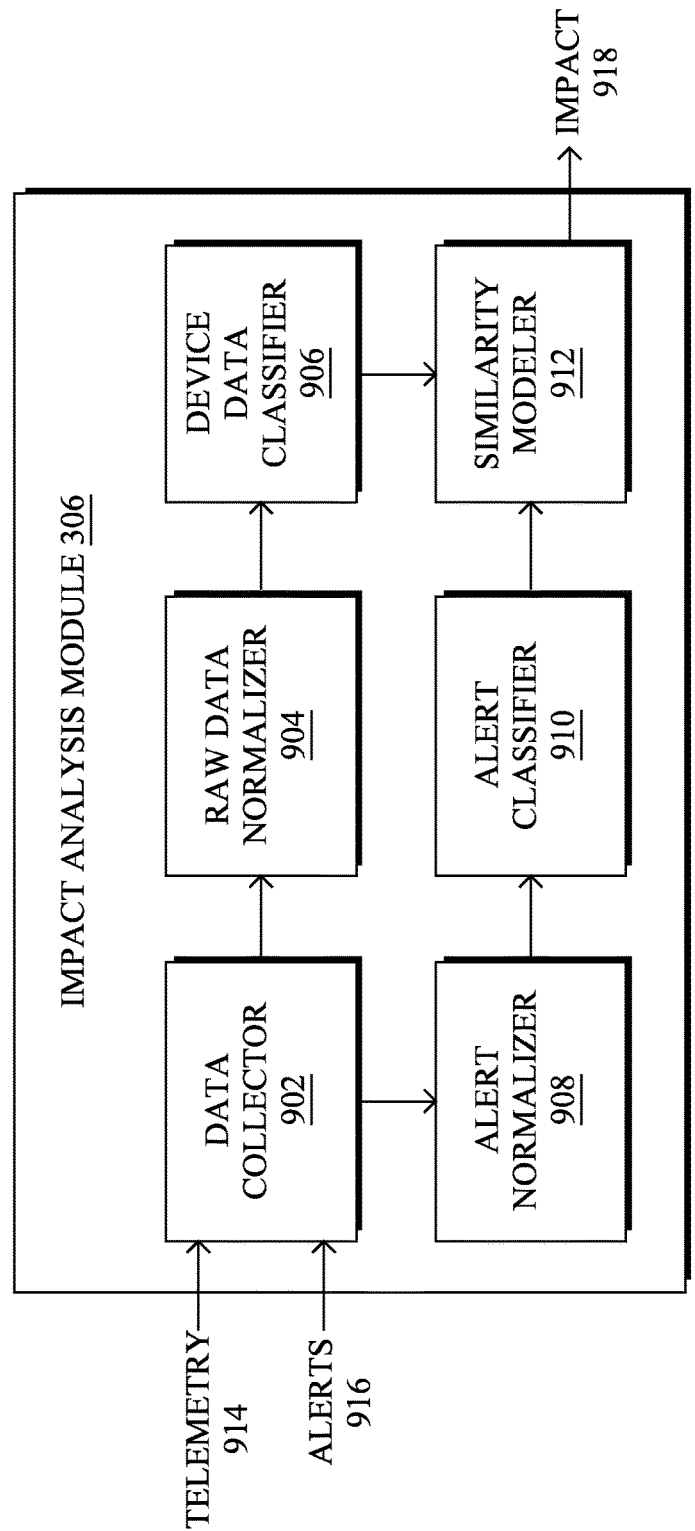
FIG. 9 illustrates an example architecture for an impact analysis module.

FIG. 9 illustrates an example architecture 900 for impact analysis module 306, in various embodiments. As shown, impact analysis module 306 may include any or all of the following sub-components: a data collector 902, a raw data normalizer 904, a device data classifier 906, an alert normalizer 908, an alert classifier 910, and/or a similarity modeler 912. Similar to the other software components detailed above, the functionalities of the sub-components of impact analysis module 306 may be combined, omitted, or implemented in a distributed manner, as desired.

At a high level, impact analysis module 306 works by watching what problems/issues are detected for a given device and monitor whether they are resolved over time. Should that device encounter a significant, high severity event (e.g., a crash/failure, outage, etc.), impact analysis module 306 may asses the unresolved issues up to, and at, that point in time, to see whether they may have contributed to the significant event. In various embodiments, impact analysis module 306 may leverage machine learning to assess a large data set of devices, issues, and events, to learn how certain unresolved, lower severity issues, can contribute to higher severity events. In turn, impact analysis module 306 may send the learned impact 918 to a user interface or, in some cases, directly to the affected devices, to help address the low severity issues before they lead to high severity events/issues.

To this end, impact analysis module 306 may include a data collector 906 configured to obtain telemetry 914 regarding any number of monitored devices (e.g., routers, switches, endpoints, etc.), as well as indications of any alerts 916 for these devices. In general, data collector 902 may do so either on a push or pull basis and at a configurable frequency. Telemetry 914 may, for example, include some or all of the telemetry and/or derived metadata described previously with respect to telemetry 408 in FIG. 4. Similarly, alerts 916 may be obtained either directly from the devices themselves or, in some cases, from the monitoring service for the network. Once obtained, data collector 906 may combine and store the telemetry 914 and alerts 916 for consumption by raw data normalizer 904 and alert normalizer 908, respectively.

During execution, raw data normalizer 904 may apply a normalization model to the collected telemetry 914 such as the configuration and operational state information for the device. Notably, different devices, software versions, etc. may use different schemas for their telemetry 908, requiring raw data normalizer 904 to first put this data into a common format for review across devices. Device data classifier 906 may use unsupervised machine learning to extract out the common attributes from the normalized data from raw data normalizer 904 over time.

Similar to the analysis of telemetry 914, alert normalizer 908 may normalize the various alerts 916 obtained by data collector 902, according to a common alert model. For example, alert normalizer 908 may apply a term extractor and/or text normalizer, to identify the conceptual value or subject of each alert 916. For example, alert normalizer 908 may apply Term Frequency-Inverse Document Frequency (TF-IDF) techniques to alerts 916. In turn, alert classifier 910 may apply unsupervised machine learning to the normalized alert text over time, to extract out the common traits/attributes of the alerts 916 over time.

According to various embodiments, impact analysis module 306 may also include a similarity modeler 912 that is configured to discern the impact 918 of a given alert 916 going unresolved. To do so, similarity modeler 912 may assess the common device attributes from device data classifier 906 and the common alert traits learned by alert classifier 912, to isolate potential alerts 916 that may be a contributing factor to a severe issue or failure experienced by a device.

Figure 10B:
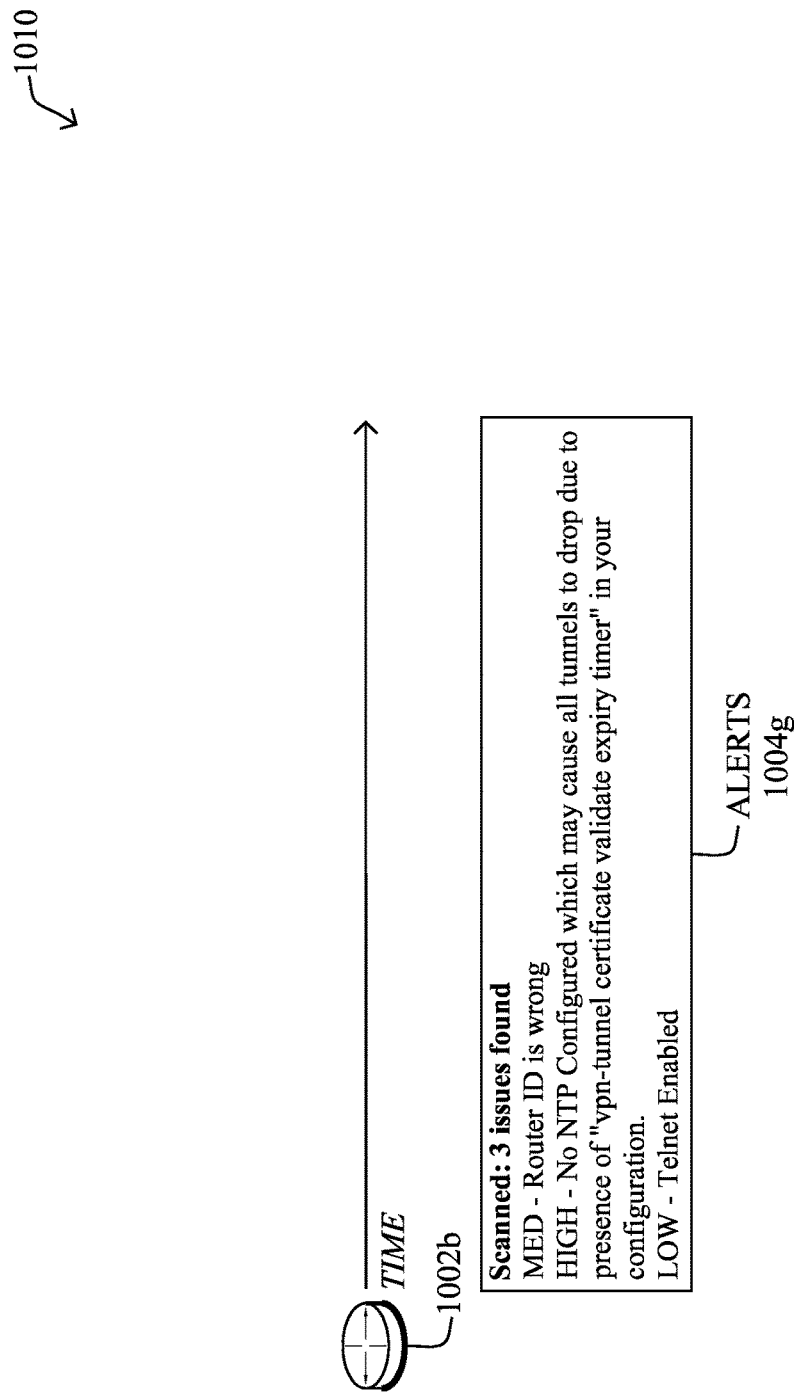

By way of example of the operation of impact analysis module 306. FIG. 10A illustrates an example 1000 of the alerts 1004 raised for two devices in the monitored network: device 1002a and device 1002b over time. As shown, assume that device 1002a first raised alerts 1004a which included two low severity alerts: 'No NTP configured' and 'Console Password Missing.' as well as a high severity alert: "Wrong Duplex—Packet Loss." Subsequently, assume that the next round of alerts 1004b indicate that the high severity alert has been addressed, as well as the low severity alert regarding the console password. However, the low severity alert regarding NTP not being configured on device 1002a has not yet been addressed. Then, a failure 1006a occurs whereby all VPN tunnel certificates were marked as invalid, causing the tunnels to be dropped. The next round of alerts 1004c then indicates that the NTP-related alert has still not been addressed.

On its face, the mere fact that the NTP-related alert was not addressed for device 1002a is not enough for impact analysis module 306 to deduce that this was a contributing factor. However, assume that device 1002b also raises alerts 1004d that include the low severity 'No NTP Configured' alert, a medium severity 'Router ID is Wrong' alert, and another low severity 'Telnet Enabled' alert, which precedes the same type of failure 1006b as that of failure 1006a exhibited by device 1002a. While the alerts 1004e and 1004f indicate that the medium severity alert had been addressed, the lower severity alerts persisted beyond failure 1006b.

Referring again to FIG. 9, by assessing the normalized, unresolved alerts 916 associated with critical failures exhibited by any number of devices in the network, similarity modeler 912 may learn which unresolved alerts, if any, often preceded the same type of failure. For example, through analysis of the alerts 1004 and failures 1006 shown in FIG. 10A, device data classifier may output the following phrase: devices with 'vpn-tunnel certificate validate expiry timer', while alert classifier 910 may extract out the phrase 'No NTP Configured' from the unresolved alerts 916 common to the devices that experienced the tunnel certificate failures. In this way, similarity modeler 912 may tie the tunnel certificate failures to the 'No NTP Configured' alerts as an impact 918.

In various embodiments, impact analysis module 306 may provide the impact 918 in conjunction with an alert 916 to a user interface regarding the one or more unresolved issues. For example, as shown in example 1010 in FIG. 10B, assume that alerts 1004g are provided to the user interface regarding device 1002b, after identifying the VPN certificate failure/issue as a potential impact of ignoring the NTP configuration alert. In such a case, rather than flagging the NTP configuration alert as low severity, the system may instead flag the alert as being of high severity and include an explanation that ignoring this alert could lead to tunnel failures.

Figure 11:
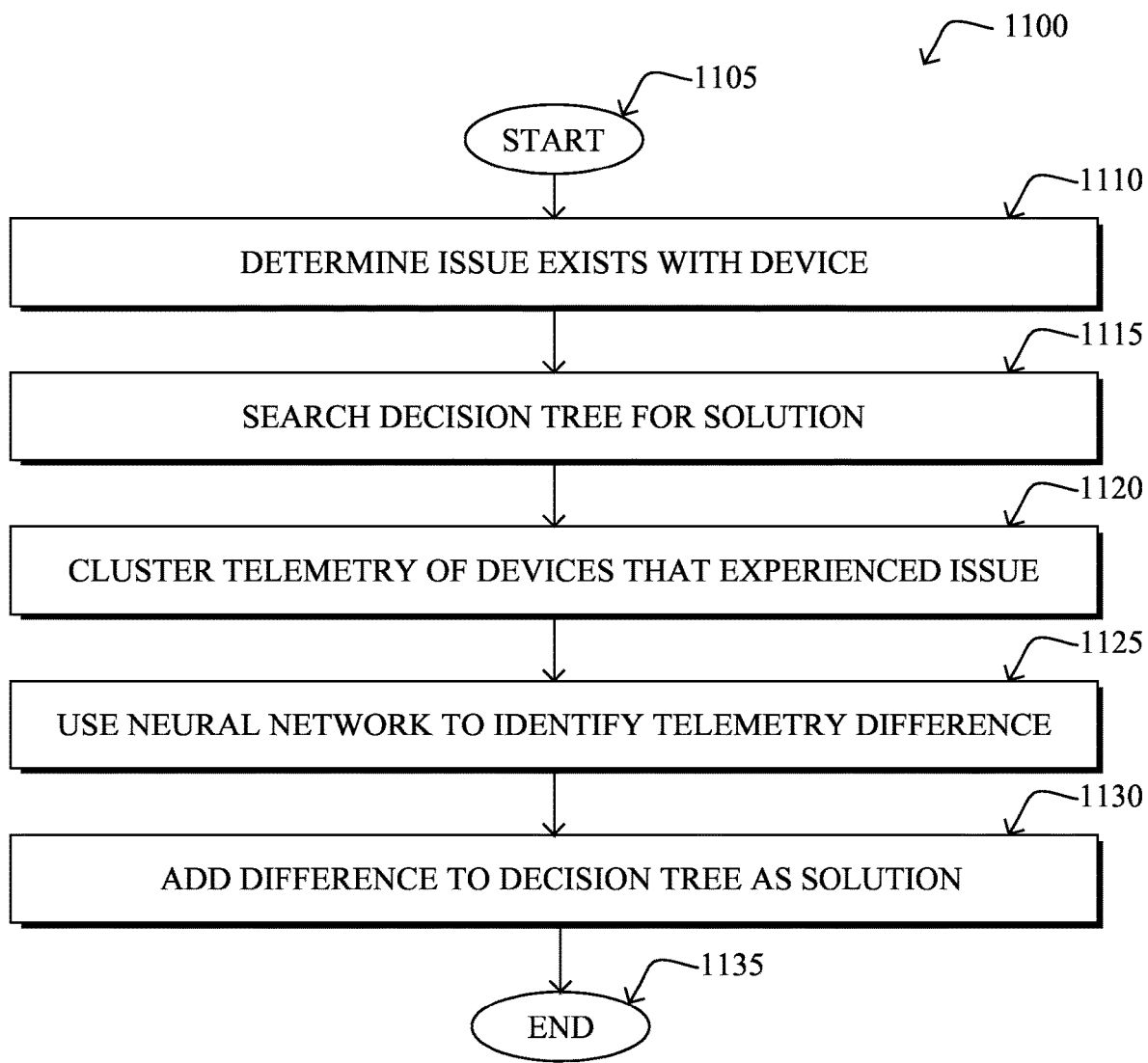
FIG. 11 illustrates an example simplified procedure for automatically identifying issues and solutions in a network.

FIG. 11 illustrates an example simplified procedure for automatically identifying issues/problems and solutions in a network in accordance with one or more embodiments described herein. For example, a non-generic, specifically configured device (e.g., device 200) may perform procedure 1100 by executing stored instructions (e.g., process 248), to provide an issue analysis service to any number of monitored networks. The procedure 1100 may start at step 1105, and continues to step 1110, where, as described in greater detail above, the service may determine that an issue exists with a device in a network. Such a device may be, for example, a router, a switch, a firewall, another form of networking equipment, or even an endpoint device, in some cases. To identify the issue, the service may apply heuristics or thresholds to telemetry data obtained regarding the device or, alternatively, by applying machine learning-based anomaly detection to the telemetry. Note that, generally speaking, an issue may refer to any undesirable condition of the device. Thus, failures may represent a more severe subset of issues whereby operation of the device and/or a portion of the network is impacted. For example, a high CPU utilization by the device may represent an issue, in some cases, but may or may not give way to an actual failure (e.g., packets being dropped as a result).

At step 1115, as detailed above, the service may search a decision tree for a solution to the issue. In various embodiments, branch nodes of the decision tree comprise diagnostic checks and at least some of the leaf nodes of the decision tree may represent solutions. Thus, the service may use telemetry and/or metadata that augments the telemetry regarding the device to walk through the various diagnostic checks encoded in the decision tree, in an attempt to arrive at a solution leaf node.

At step 1120, the service may, based on a determination that a solution to the issue does not exist in the decision tree, cluster the telemetry for the device with telemetry for one or more other devices that also experience the issue, as described in greater detail above. For example, assume that the devices that exhibit high CPU utilization that cannot be explained by the decision tree all have the same configurations A, B, and C, as indicated by their telemetry data. In such a case, the service may apply clustering to these sets of telemetry, to group the devices together for purposes of analysis.

At step 1125, as detailed above, the service may use a neural network to identify a difference between the clustered telemetry and telemetry from one or more devices for which the issue was resolved. Generally speaking, application of a neural network to the data sets allows the service to identify any changes in the telemetries for the devices that are likely to be the reason for the resolutions of the issues. For example, assume that some of the devices in the above cluster stopped exhibiting the high CPU issue, after their configuration B was changed to configuration B'. Through the application of a neural network to this problem, the service can deduce that this configuration change is a possible solution to the high CPU utilization issue.

At step 1130, the service may add a leaf node to the decision tree with the identified difference as a solution to the issue, as described in greater detail above. By doing so, further searches of the decision tree by the service for future occurrences of the issue will yield the solution. In turn, the service can either automatically affect the change (e.g., by making a configuration change directly) or by providing data regarding the solution to a user interface for review by an administrator. In some embodiments, once the decision tree has been updated, the service may also use the updated tree to re-analyze any devices for which a solution was not found. In other words, the service could use the updated tree to solve any new problems that arise and could also use the updated tree to retroactively solve previously arisen issues, as well. Procedure 1100 then ends at step 1135.

It should be noted that while certain steps within procedure 1100 may be optional as described above, the steps shown in FIG. 11 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, enhance the operations of network monitoring systems in a number of ways. In some aspects, the techniques herein allow for the automatic identification of new issues and solutions in the network. In further aspects, the techniques herein also allow for the detection and review of changes of traits leading up to a failure in the network. In another aspect, the techniques herein further allow for the assessment of the impact of ignoring certain, lower severity alerts, providing greater context to the administrator.

While there have been shown and described illustrative embodiments that provide for a network issue tracking and resolution system, it is to be understood that various other adaptations and modifications may be made within the spirit and scope of the embodiments herein. For example, while certain embodiments are described herein with respect to using certain models for purposes of extracting common traits and identifying telemetry differences, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by an issue analysis service, telemetry data from a plurality of devices in a network across a plurality of time intervals;
   detecting, by the issue analysis service, a failure event in which a device in the network is in a failure state;
   clustering, by the issue analysis service, the telemetry data obtained prior to the failure event into rounds according to time intervals in which the telemetry data was collected, each round corresponding to a particular time interval;
   applying, by the issue analysis service, a machine learning-based classifier to each one of the rounds of clustered telemetry data to identify one or more common traits appearing in the telemetry data for each round; and
   generating, by the issue analysis service, a trait change report indicating a change in the one or more common traits appearing in the telemetry data across the rounds leading up to the failure event.

2. The method as in claim 1, wherein the device comprises a router or switch.

3. The method as in claim 1, further comprising:
   augmenting, by the issue analysis service, the telemetry data with derived metadata.

4. The method as in claim 1, wherein generating the trait change report indicating the change in the one or more common traits appearing in the telemetry data across the rounds leading up to the failure event comprises:
   comparing, by the issue analysis service, one or more common traits appearing in the telemetry data for a first round to one or more common traits appearing in the telemetry data for a second round.

5. The method as in claim 4, further comprising:
   sending, by the issue analysis service, the trait change report to a user interface.

6. The method as in claim 1, further comprising:
   collecting, by the issue analysis service, failure data regarding the device upon detecting that the device is in the failure state.

7. The method as in claim 1, wherein the machine learning-based classifier is an unsupervised machine learning-based classifier.

8. The method as in claim 1, further comprising:
   identifying, by the issue analysis service, the change in the one or more common traits as a root cause of the failure event.

9. An apparatus, comprising:
   one or more network interfaces to communicate with a network;
   a processor coupled to the one or more network interfaces and configured to execute one or more processes; and
   a memory configured to store a process that is executable by the processor, the process when executed configured to:
   obtain telemetry data from a plurality of devices in a network across a plurality of time intervals;

detect a failure event in which a device in the network is in a failure state;

cluster the telemetry data obtained prior to the failure event into rounds according to time intervals in which the telemetry data was collected, each round corresponding to a particular time interval;

apply a machine learning-based classifier to each one of the rounds of clustered telemetry data to identify one or more common traits appearing in the telemetry data for each round; and generate a trait change report indicating a change in the one or more common traits appearing in the telemetry data across the rounds leading up to the failure event.

10. The apparatus as in claim 9, wherein the device comprises a router or switch.

11. The apparatus as in claim 9, wherein the process when executed is further configured to:

augment the telemetry data with derived metadata.

12. The apparatus as in claim 9, wherein the apparatus generates the trait change report indicating the change in the one or more common traits appearing in the telemetry data across the rounds leading up to the failure event by:

comparing one or more common traits appearing in the telemetry data for a first round to one or more common traits appearing in the telemetry data for a second round.

13. The apparatus as in claim 12, wherein the process when executed is further configured to:

send the trait change report to a user interface.

14. The apparatus as in claim 9, wherein the process when executed is further configured to:

collect failure data regarding the device upon detecting that the device is in the failure state.

15. The apparatus as in claim 9, wherein the machine learning-based classifier is an unsupervised machine learning-based classifier.

16. The apparatus as in claim 9, wherein the process when executed is further configured to:

identify the change in the one or more common traits as a root cause of the failure event.

17. A tangible, non-transitory, computer-readable medium that stores program instructions that cause an issue analysis service that operates on a device comprising a processor and a memory to execute a process comprising:

obtaining, by the issue analysis service, telemetry data from a plurality of devices in a network across a plurality of time intervals;

detecting, by the issue analysis service, a failure event in which a device in the network is in a failure state;

clustering, by the issue analysis service, the telemetry data obtained prior to the failure event into rounds according to time intervals in which the telemetry data was collected, each round corresponding to a particular time interval;

applying, by the issue analysis service, a machine learning-based classifier to each one of the rounds of clustered telemetry data to identify one or more common traits appearing in the telemetry data for each round; and generating, by the issue analysis service, a trait change report indicating a change in the one or more common traits appearing in the telemetry data across the rounds leading up to the failure event.

18. The tangible, non-transitory, computer-readable medium as in claim 17, wherein the device comprises a router or switch.

19. The tangible, non-transitory, computer-readable medium as in claim 17, wherein the process further comprises:

augmenting, by the issue analysis service, the telemetry data with derived metadata.

20. The tangible, non-transitory, computer-readable medium as in claim 17, wherein generating the trait change report indicating the change in the one or more common traits appearing in the telemetry data across the rounds leading up to the failure event comprises:

comparing, by the issue analysis service, one or more common traits appearing in the telemetry data for a first round to one or more common traits appearing in the telemetry data for a second round.

* * * * *